(12) United States Patent
Chang

(10) Patent No.: US 6,485,076 B1
(45) Date of Patent: Nov. 26, 2002

(54) VERSATILE ATTACHMENT FOR A SHOVEL

(76) Inventor: William Nai-Jen Chang, 20 Glen Echo Court, Brampton, Ontario (CA), L6S 5T9

(*) Notice: Subject to any disclaimer, the term of this patent is extended or adjusted under 35 U.S.C. 154(b) by 31 days.

(21) Appl. No.: 09/800,825

(22) Filed: Mar. 8, 2001

(51) Int. Cl.[7] .............................. A01B 1/22; B25G 3/38
(52) U.S. Cl. ................................. 294/58; 254/131.5
(58) Field of Search .......................... 294/54.5, 57–59; 16/422, 426; 37/265, 285; 254/131.5

(56) References Cited

U.S. PATENT DOCUMENTS

| | | | | |
|---|---|---|---|---|
| 519,515 A | * | 5/1894 | Walsh | 294/58 |
| 986,796 A | * | 3/1911 | Behm | 294/58 X |
| 1,456,879 A | * | 5/1923 | Newman | 294/58 |
| 2,244,585 A | * | 6/1941 | Tweit | 294/58 X |
| 2,772,910 A | * | 12/1956 | Doyle | 294/58 |
| 3,155,414 A | * | 11/1964 | Bales | 294/58 |
| 4,050,728 A | * | 9/1977 | Davidson | 294/58 |
| 4,794,667 A | * | 1/1989 | Nelson | 294/58 X |
| 4,881,332 A | * | 11/1989 | Evertsen | 294/59 X |
| 5,669,651 A | * | 9/1997 | Vroegindewey | 294/58 |

FOREIGN PATENT DOCUMENTS

DE 1114353 * 9/1961 .................. 294/58

* cited by examiner

Primary Examiner—Johnny D. Cherry

(57) ABSTRACT

A versatile attachment in the form of an elongated member having an obtuse angle is mounted on a shovel handle. The lower end of the elongated member is pivotally mounted in a cantilever manner to the lower portion of the shovel handle. The elongated member mounted with the obtuse angle portion of the elongated member located selectively either above or below the longitudinal axis of the shovel handle. A cross bar member is provided at the upper free end of the elongated member and a rotary wheel is rotatably mounted on the cross bar member. A strap is provided at the shovel handle and is operative for securing the attachment to the latter.

3 Claims, 14 Drawing Sheets

VERSATILE ATTACHMENT FOR A SHOVEL

BACKGROUND OF THE INVENTION

An implement such as a shovel is commonly used for manual digging and clearing operations of ground or snow. Such operations are strenuous and they exert severe strain in one's back since they require digging and pushing of the load to be carried out with one's back in a forward bending posture. Furthermore, considerable back strength is particularly required in lifting the soil or snow with a shovel. For this reason, back injuries are common in such operations.

Shovels having various handle configurations have been provided for alleviating the above problems. In one construction, the upper portion of the shovel handle is bent rearwards at an angle such that the pushing operation may be carried out with one's body in a more upright posture. However, such shovel is not conducive for digging and it has not resolved the problem of causing harmful strain on one's back in lifting the load with the shovel, since it still has to be carried out with one's body in a bent forward posture.

In another construction, an auxiliary straight bar is mounted on the shovel handle such that one may lift the weight of the load on the shovel by holding the shovel handle with one hand and the auxiliary straight bar with the other in order to lessen the strain on one's back. However, it still requires the pushing or plowing operation to be carried out with the body in a forward bending posture.

SUMMARY OF THE INVENTION

It is a principal object of the present invention to provide an attachment on a shovel which facilitates the digging and pushing operations to be carried out with the user's body in a substantially upright posture.

It is another object of the present invention to provide an attachment on a shovel which is operative to ease the digging and clearing operations.

It is another object of the present invention to provide an attachment which enables the load on the shovel to be unloaded without having to lift the shovel.

It is still another object of the present invention to provide an attachment which is versatile.

It is yet another object of the present invention to provide an attachment which is simple in construction and is convenient to use.

BRIEF DESCRIPTION OF THE DRAWINGS

Other objects of this invention will appear in the following description and appended claims, reference being made to the accompanying drawings forming a part of the specification in which:

DETAILED DESCRIPTION OF THE PREFERRED EMBODIMENTS

Figure 1:
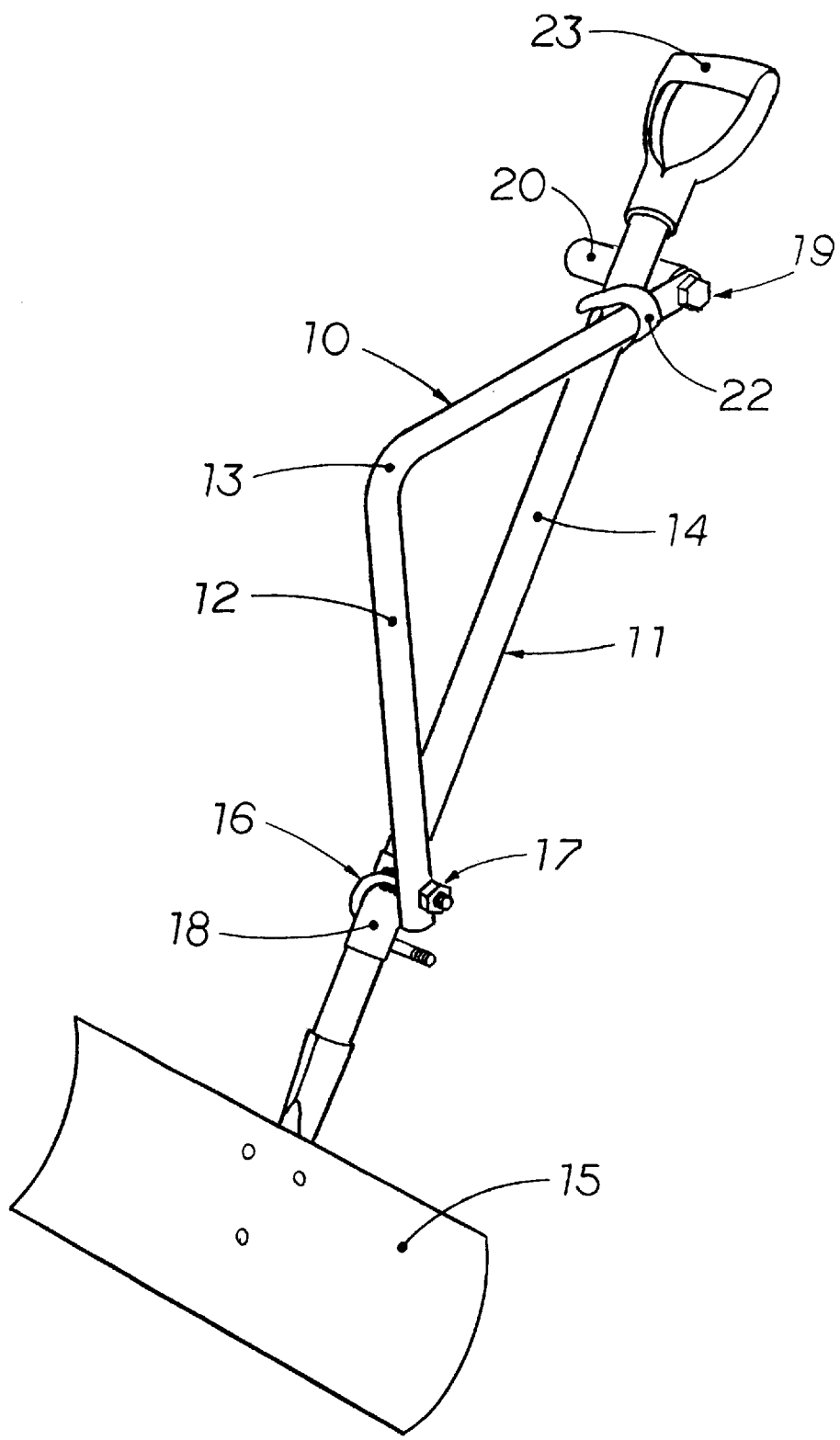
FIG. 1 is a front perspective elevation of a snow shovel having the attachment according to the present invention provided thereon.
Figure 2:
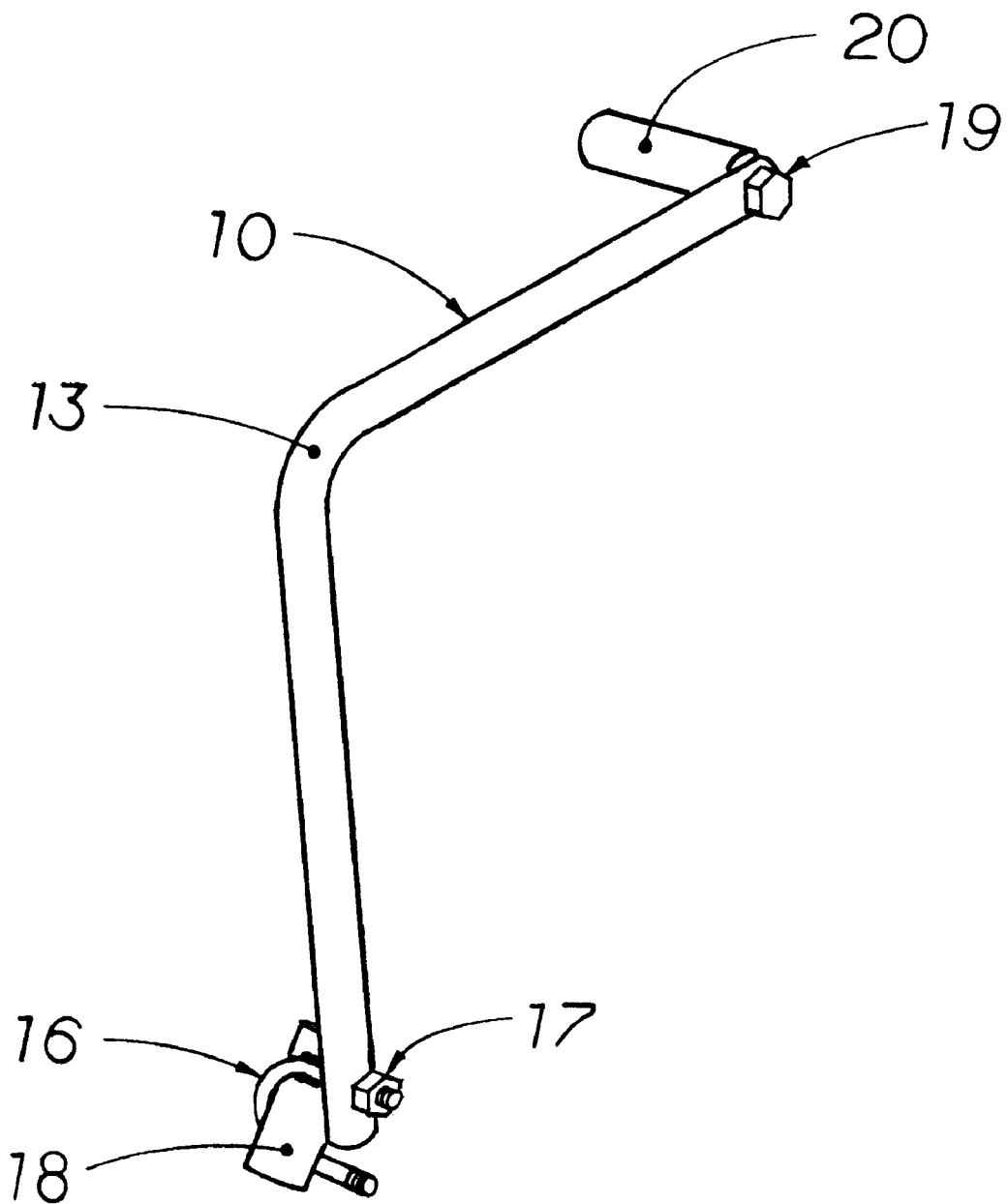
FIG. 2 is a front perspective isolated view of the attachment according to the present invention.
Figure 3:
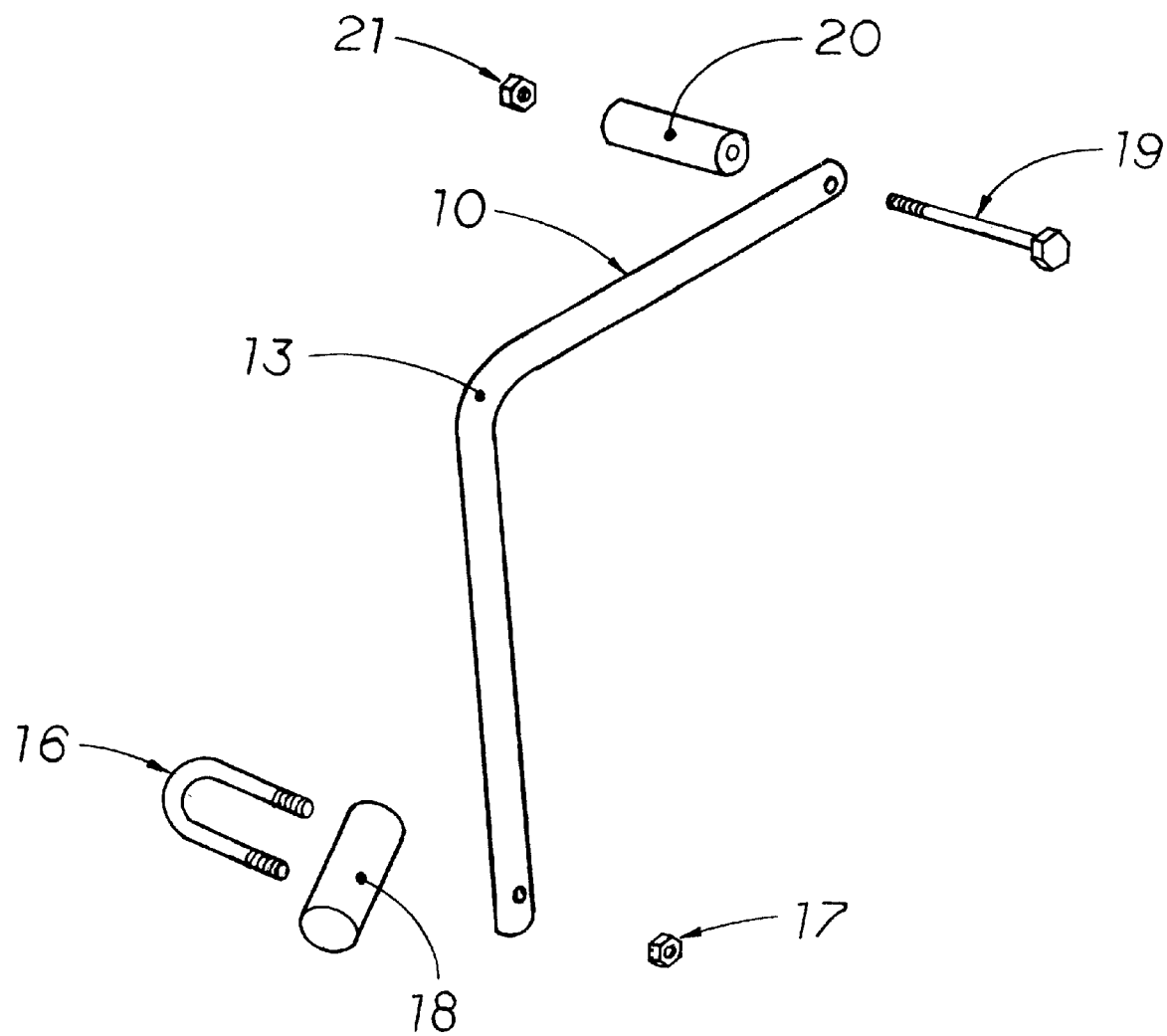
FIG. 3 is an isolated exploded elevation view of the attachment showing the component parts therein.

With reference to the drawings wherein like reference numerals designate corresponding parts in the several views, the attachment member 10 according to the present invention is provided on a snow shovel 11. A snow shovel is shown as an example to illustrate the present invention. It will be apparent to one skilled in the art that the same construction may be incorporated in any type of shovel to obtain the same desired results. The attachment member 10 is in the form of an elongated member 12 having an obtuse angle portion 13 formed therein. The lower end of the attachment member 10 is pivotally and removably mounted in a cantilever manner to the lower end of the handle shaft 14 of the shovel 11 adjacent to the shovel blade 15. A U-clamp 16 is shown as an example for mounting the attachment member 10 to the shovel handle shaft 14 and a nut 17 is used to secured the attachment member 10 in place. It can be appreciated by those skilled in the art that the attachment member 10 may be mounted by other means such as with a bolt provided on the shovel handle shaft 14 or other similar method to serve the same purpose. A short sleeve 18 may be provided on the shovel handle shaft 14 to facilitate the mounting of the attachment member 10. The attachment member 10 may be mounted in various positions as shown in FIGS. 4, 5, 6 and 7 to serve a variety of purposes which will become apparent in the following description.

As shown in FIG. 1, the attachment member 10 is mounted in the storage position. A cross bar member 19 is located at the upper end of the attachment member 10. The cross bar member 19 may be provided simply by an elongated bolt extending perpendicular to the attachment member 10. A cylindrical rotary wheel 20 is rotatably mounted on the cross bar member 19 and is secured in place with a nut 21 mounted to the bolt. A strap 22 is provided on the handle shaft 14 and adapted to secure the attachment member 10 to the latter in the normal position with the rotary wheel 20 abutting the underside of handle shaft 14 and located adjacent to the hand grip 23 of the shovel.

Figure 9:
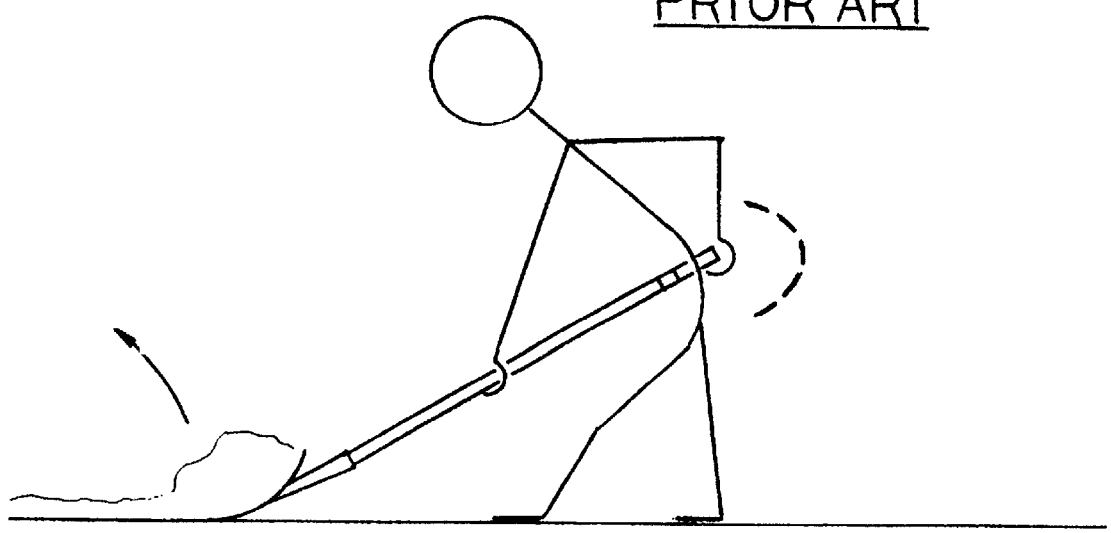
FIG. 9 is a schematic illustration showing the bent back posture required when using a common shovel in the digging operation.
Figure 10:
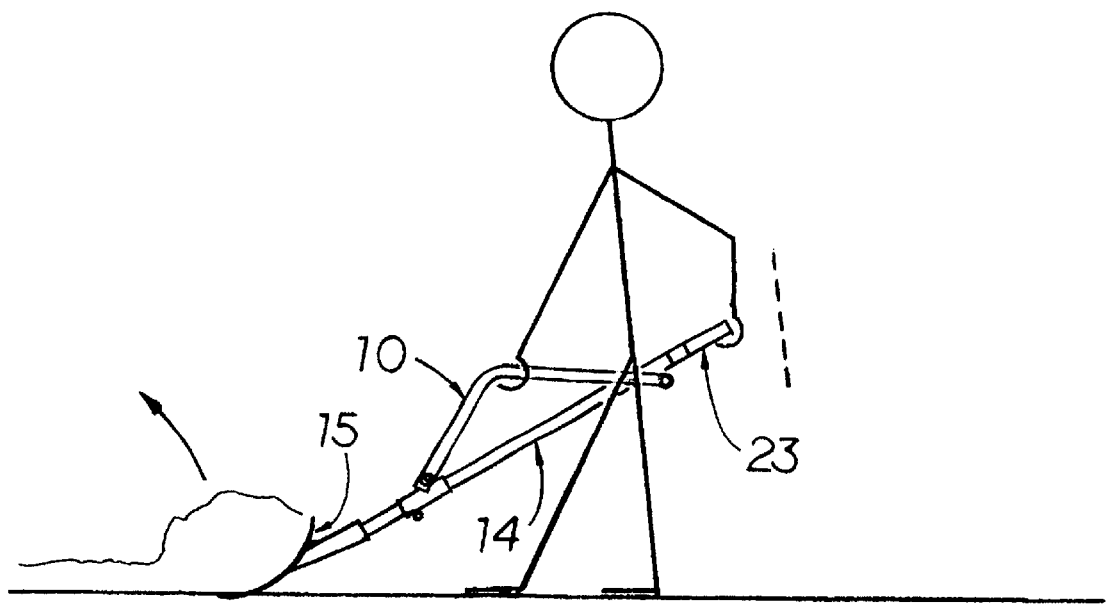
FIG. 10 is a schematic illustration showing the digging operation may be carried out with a substantially upright posture with the shovel having the attachment of the present invention provided thereon.

FIG. 9 shows the undesirable forward bending body posture of the operator in using a common shovel in the digging operation; whereas with the attachment provided on the shoves, the same digging operation may be carried out easily with the body of the operator in a substantially upright position by holding the angle portion 13 of the attachment member 10 with one hand and tilting the shovel with the other hand holding the handle grip 23 as best shown in FIG. 10.

Figure 4:
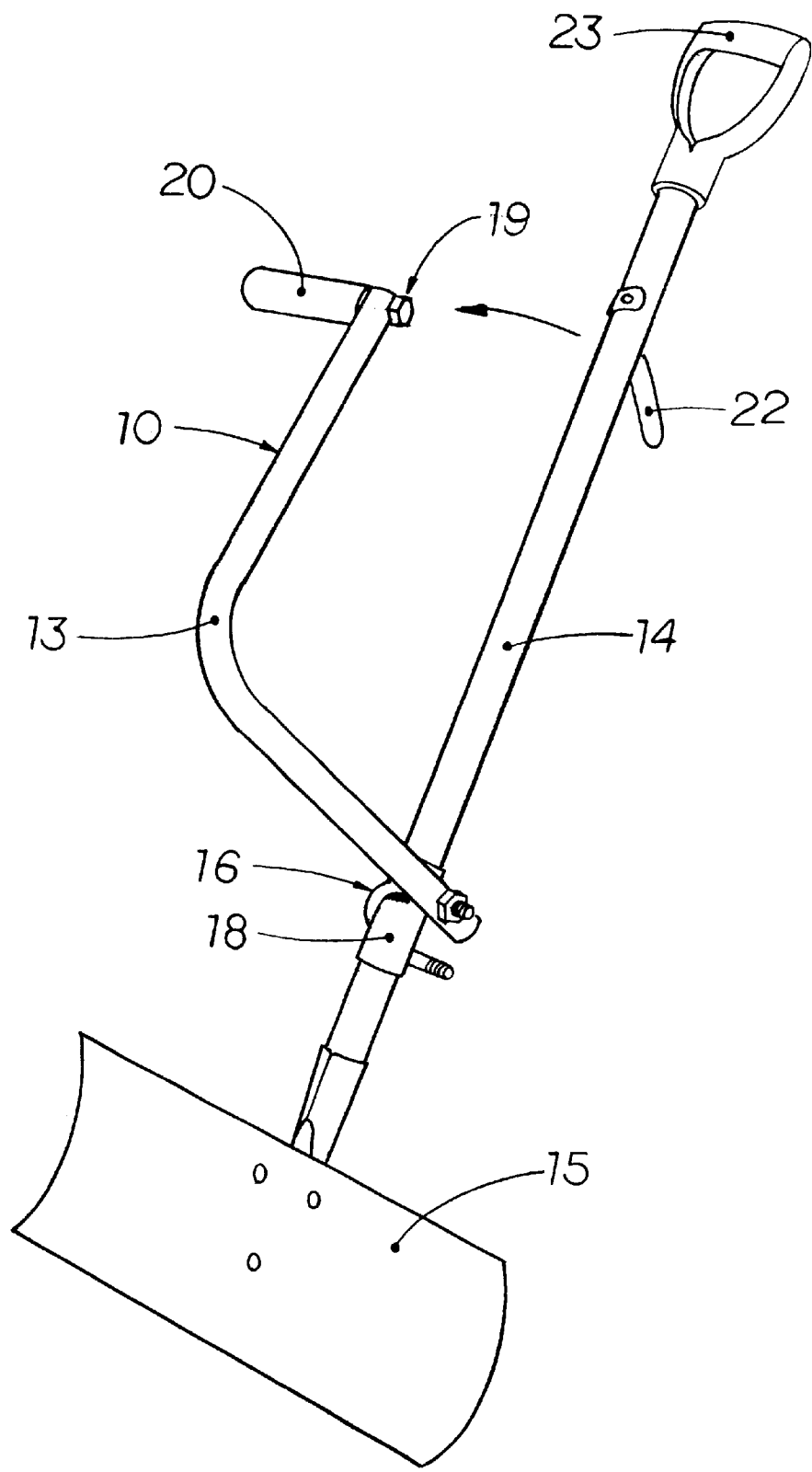
FIG. 4 is a front perspective elevation view of the snow shovel with the attachment of the present invention in the operating position for pushing the load.
Figure 11:
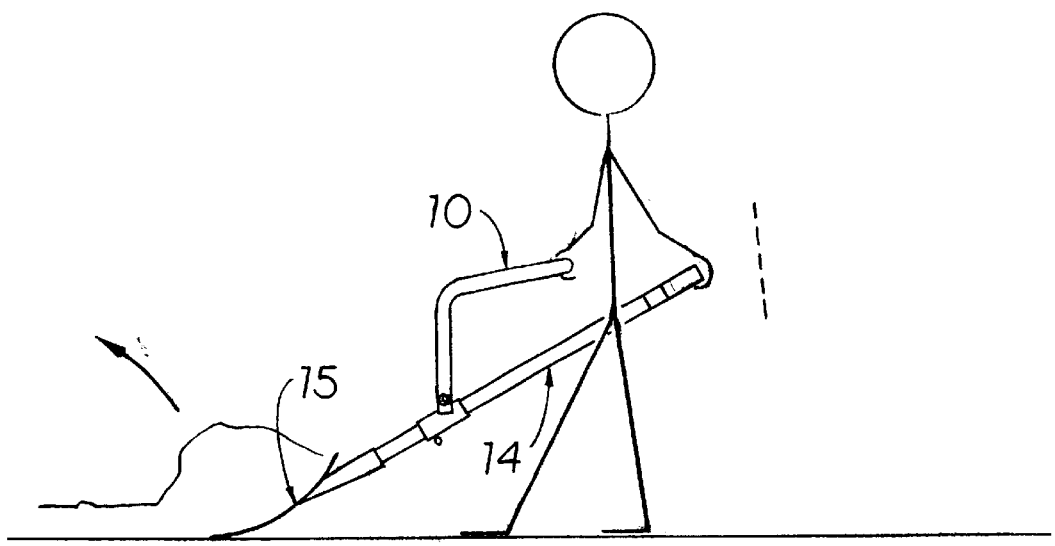
FIG. 11 is a schematic illustration showing the digging and plowing operations carried out in a body upright posture with the attachment of the present invention positioned above the shovel handle.
Figure 12:
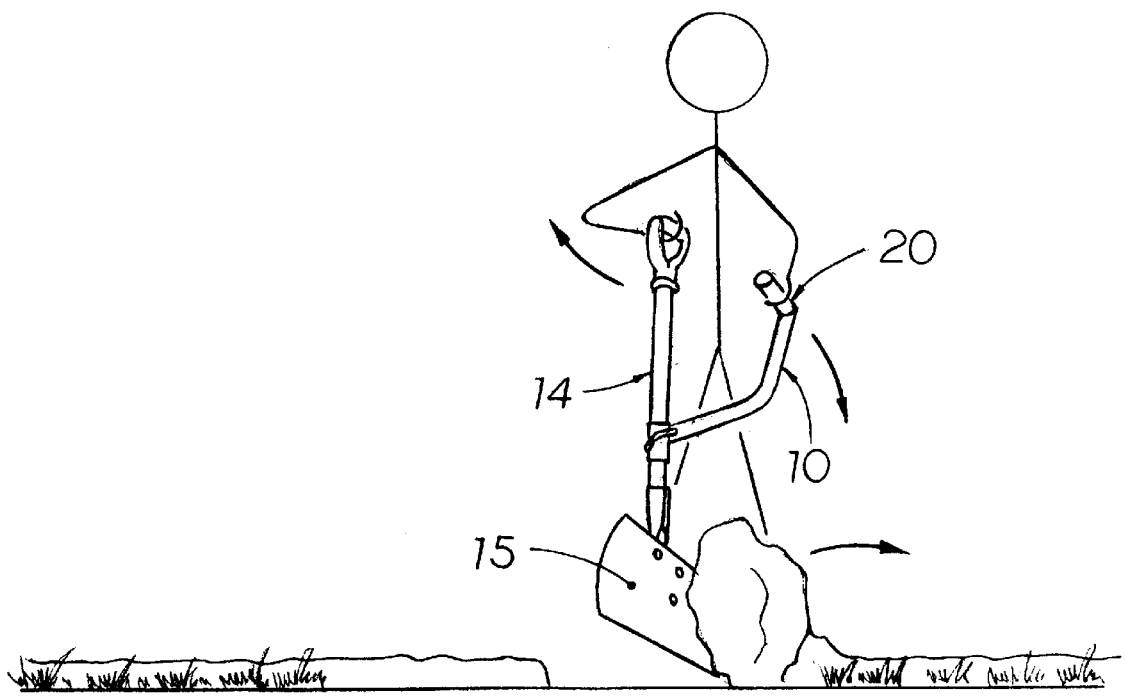
FIG. 12 is a schematic illustration showing the use of the attachment as a turning handle for removing the load from the shovel in a flipping action without having to lift the shovel.

When the attachment member 10 is mounted in the position as shown in FIG. 4 with its free end located above the handle shaft 14, digging and plowing operationts may be performed by the operator in an upright body posture with one hand holding the rotary wheel 20 and the other hand holding the hand grip 23 as shown in FIG. 11. Furthermore, the load on the shovel blade 15 may be unloaded by simply turning or flipping the blade 15 with the attachment member 10 against the handle shaft 14 so that the blade 15 flips over sideways against the ground as shown in FIG. 12 without having to lift the load. Thus, the unloading operation may be carried out easily without having to lift the load and throwing it off the blade as in using a common shovel. Thus, the unloading action may be conducted with ease with the operator's body maintained in a substantially upright position all the time, and no strain is exerted to the operator's back.

Figure 5:
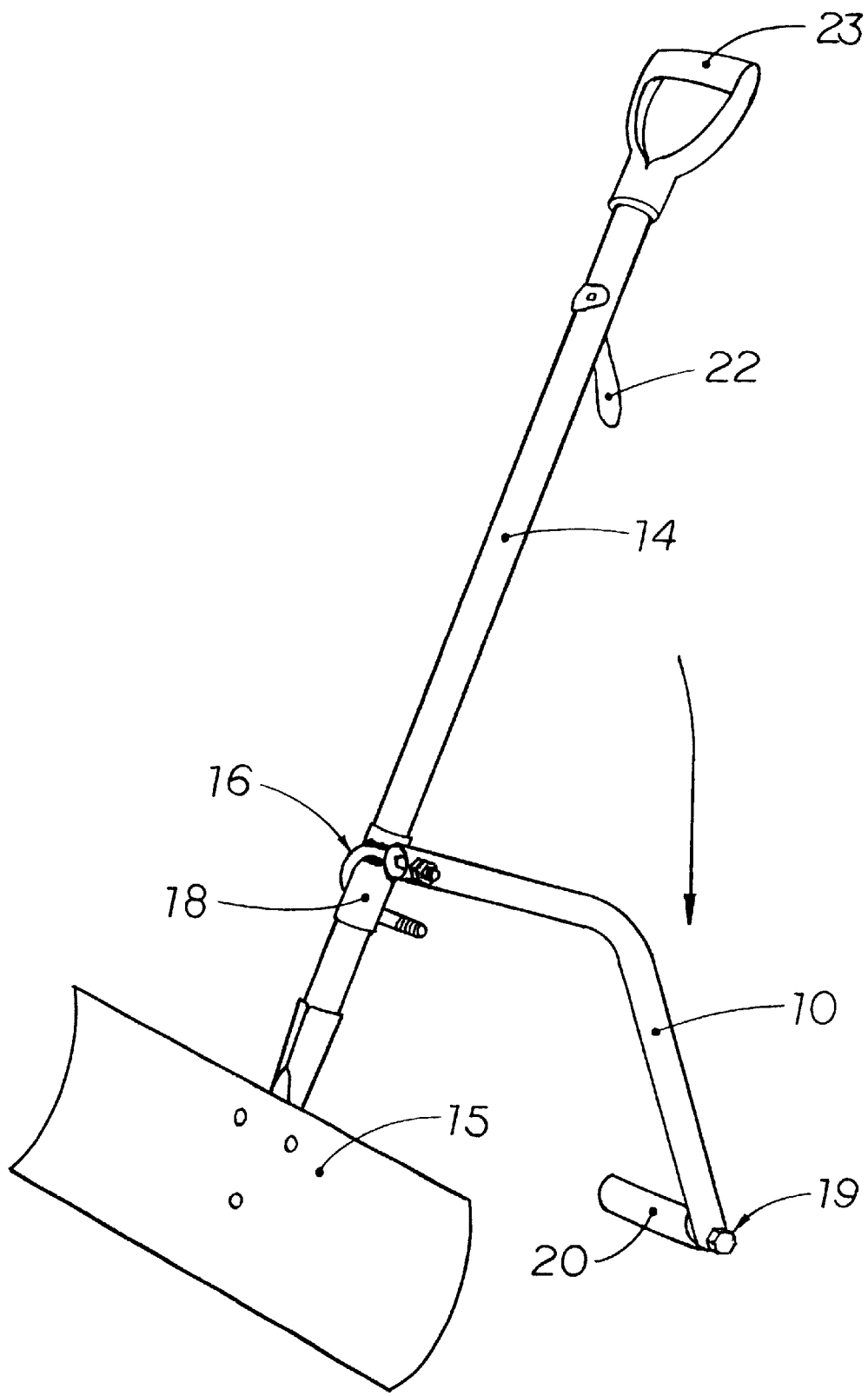
FIG. 5 is a front perspective elevation view of the snow shovel with the attachment of the present invention located with its upper free end slidable on the ground to facilitate pushing as well as providing a leverage for plowing.
Figure 6:
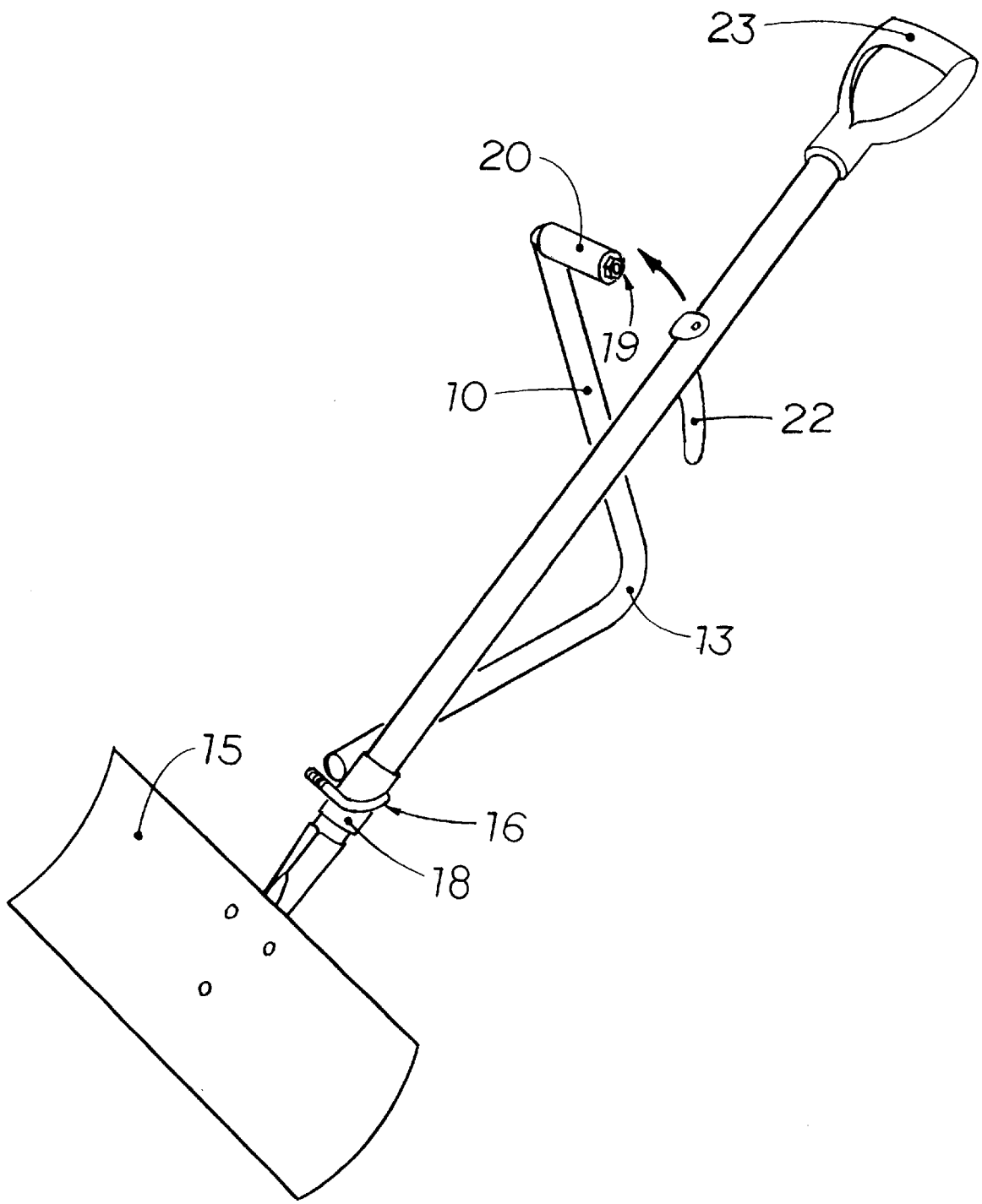
FIG. 6 is a front perspective elevation view of the snow shovel with the attachment mounted in a position with its obtuse angle portion located below the handle shaft of the shovel.
Figure 13:
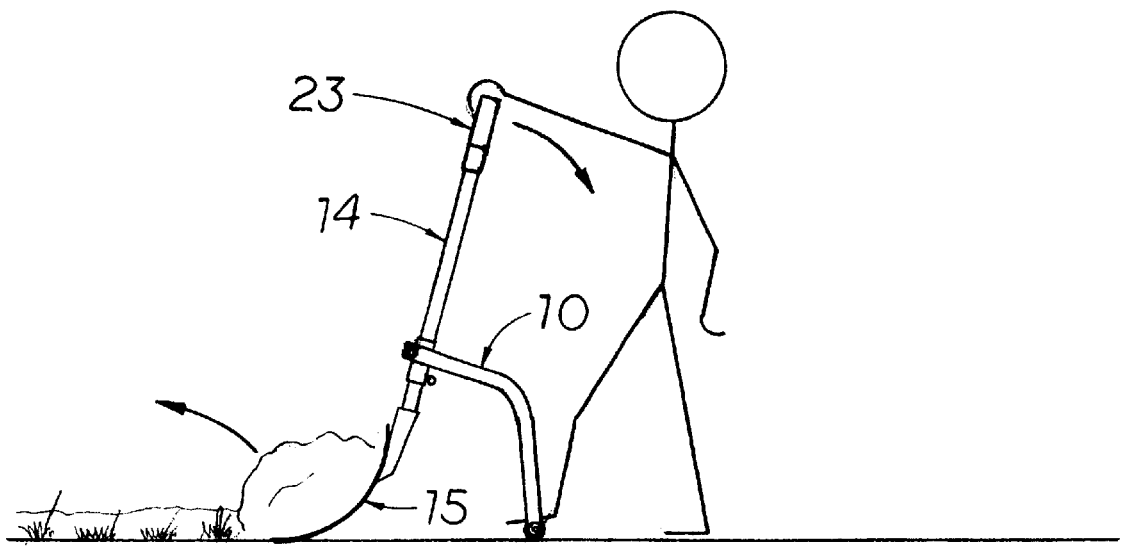
FIG. 13 is a schematic illustration showing the location of the attachment with its upper end pointing at the ground and urging with the operator's foot to facilitate the plowing and digging operations.
Figure 14:
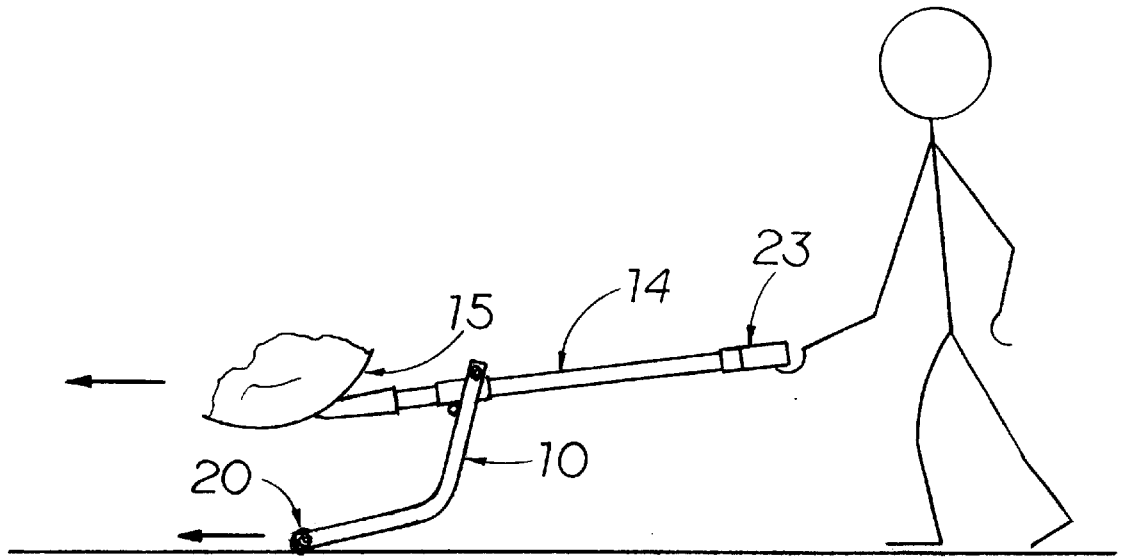
FIG. 14 is a schematic illustration showing another position of the attachment with its free end slidable on the ground to facilitate transporting the load with the shovel.

When the attachment member 10 is located in the position as shown in FIG. 5 with its free end abutting the ground, plowing and lifting operations may be performed with the attachment member 10 serving as a fulcrum to provide the leverage to obtain the mechanical advantage in carrying out these operations. The free end of the attachment member 10 may be held firmly in place by the foot of the operator in this operation as best shown in FIG. 13 for prying and lifting the load upwards with a tilting manner. The attachment member 10 may also be turned to a forward position with the rotary wheel 20 contacting the ground such that the load on the shovel may be easily transported by pushing the shovel like a wheel barrow with the rotary wheel 20 sliding and rolling on the ground while the operator maintains the body in the upright position as best shown in FIG. 14.

Figure 7:
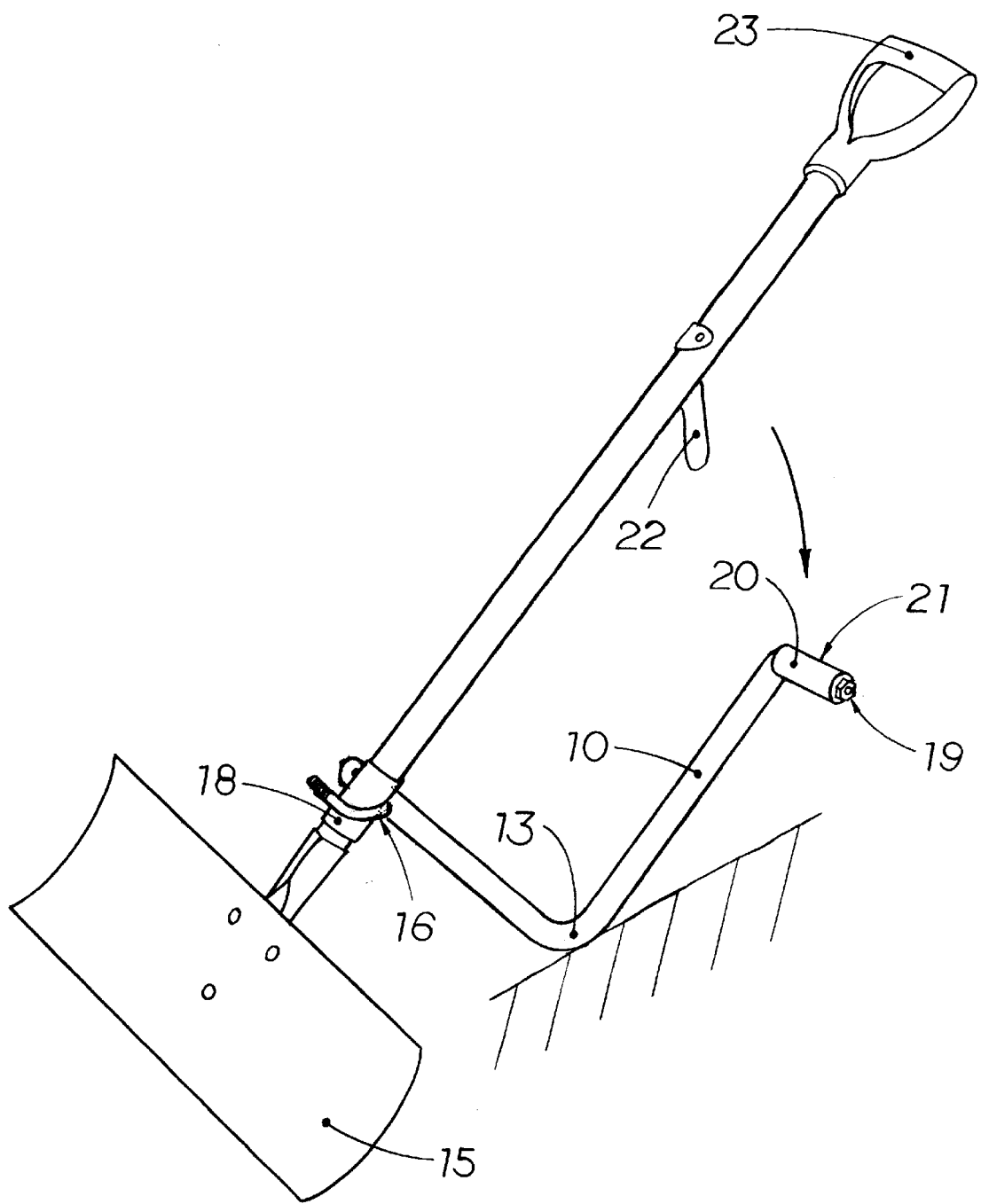
FIG. 7 is a front perspective elevation view of the snow shovel with the attachment turned to the position with the obtuse angle portion abutting the ground such that an impact force may be applied to the blade by kicking at the crossing bar of the attachment.
Figure 8:
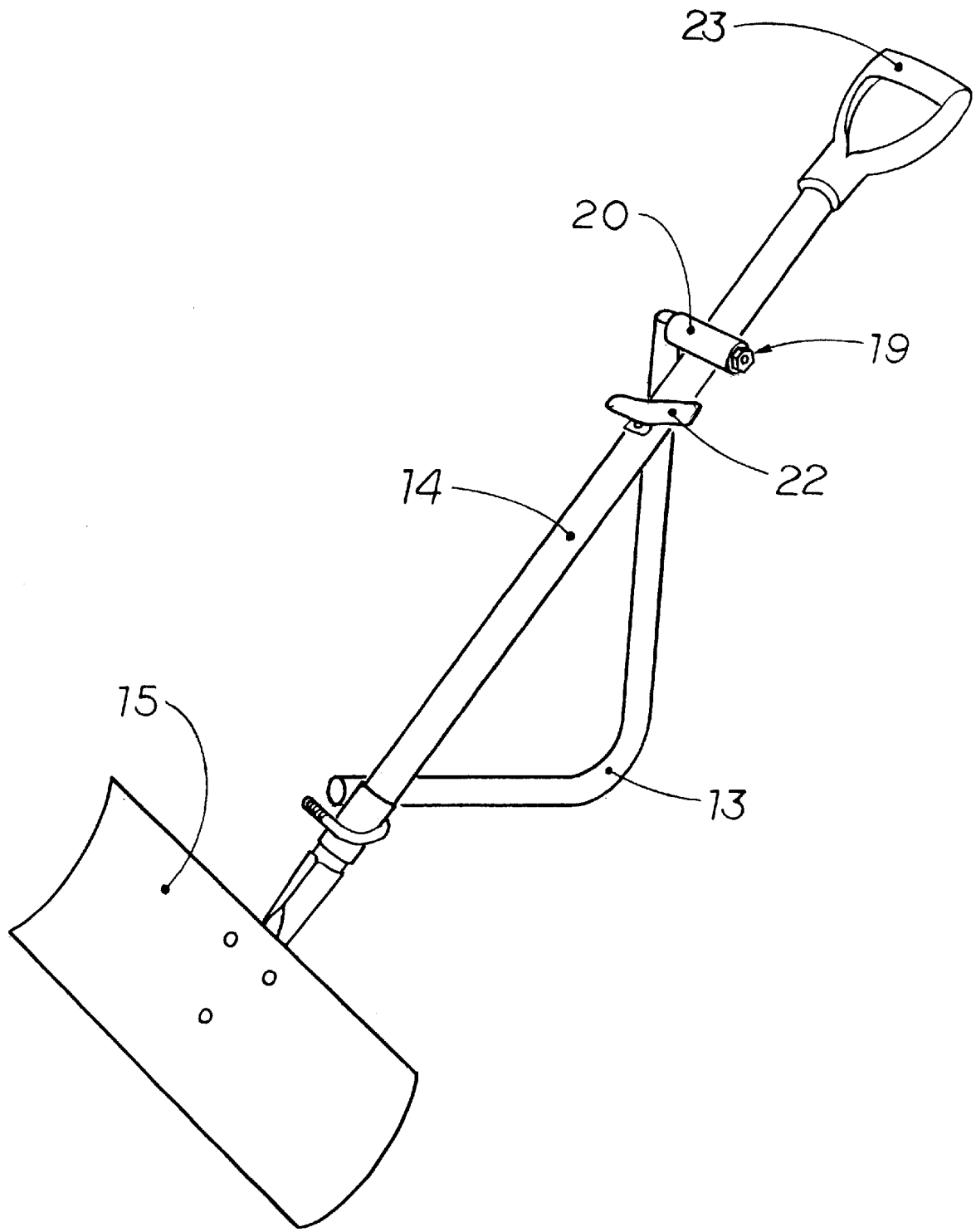
FIG. 8 is a front perspective elevation view of the snow shovel with the attachment in the position as in FIG. 6 and secured to the handle shaft of the shovel with the strap.
Figure 15:
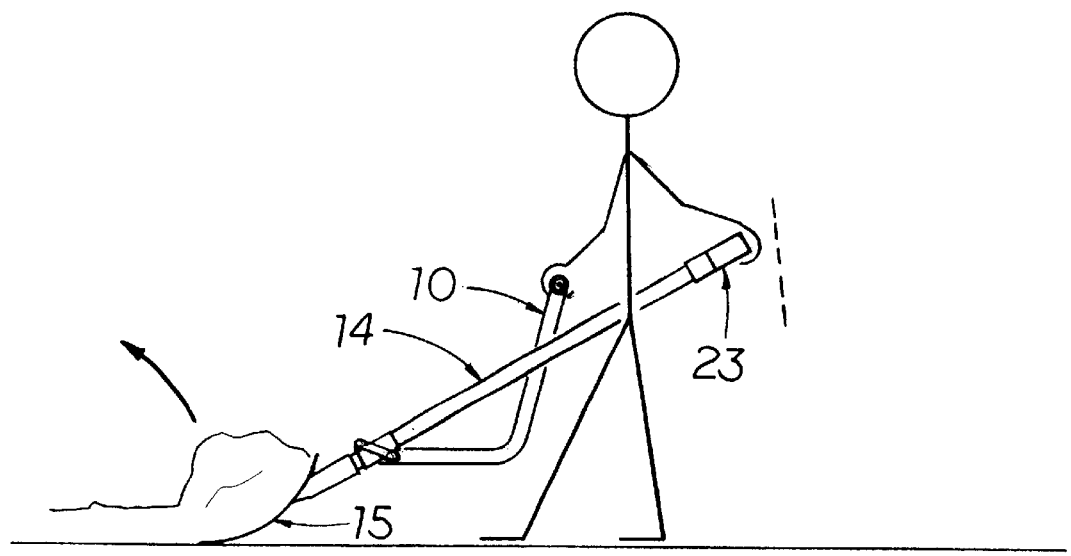
FIG. 15 is a schematic illustration showing the position of the attachment to facilitate lifting of the load with the operator's body is a substantially upright posture.
Figure 16:
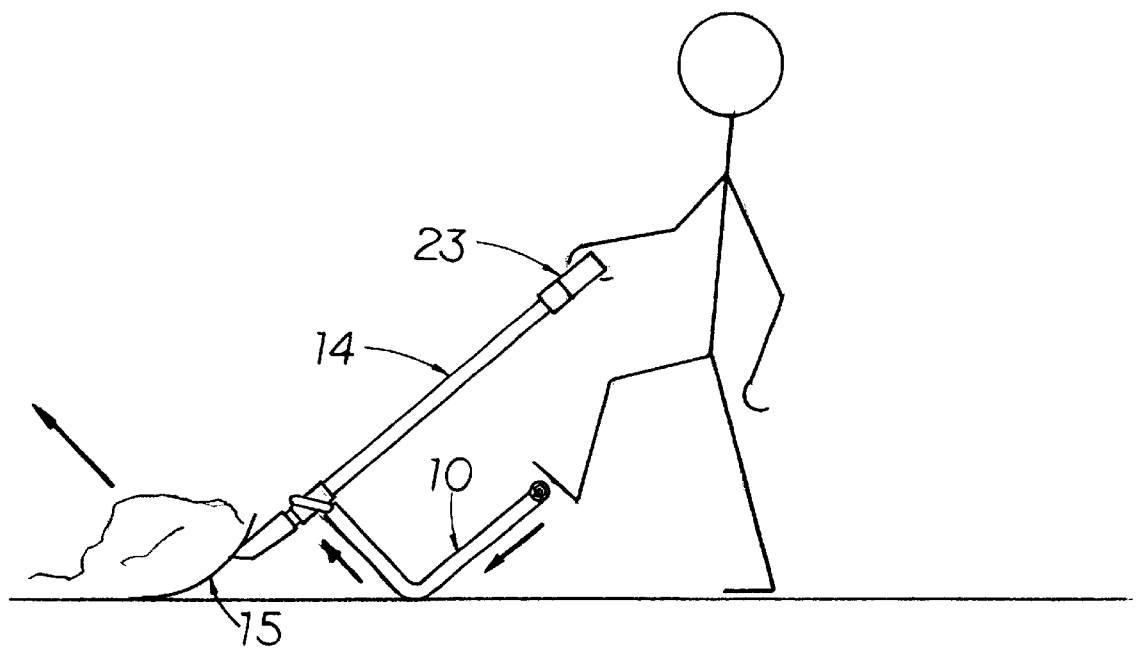
FIG. 16 is a schematic illustration showing the position of the attachment with its angle portion resting against the ground to facilitate digging operation with the operator's foot while standing in a substantially upright posture.

As shown in FIGS. 15 and 16, the digging operation may be carried out with the attachment member 10 mounted in the upside down position with the angle portion 13 located below the handle shaft 14 of the shovel 10. Digging may be carried out by holding the handle grip 23 with one hand and the rotary wheel 20 with the other hand. Due to the extension provided by the attachment member 10, the digging operation may be carried out with the body of the operator in a substantially upright posture. Furthermore, plowing may be performed by stamping or striking the cross bar 19 with the foot to provide a large blow force for the shovel blade 15 as best shown in FIG. 16 by mounting the attachment member 10 in the position as shown in FIG. 7 with the angle portion 13 abutting the ground. This operation can be easily carried out with the operator body in the upright position.

Figure 17:
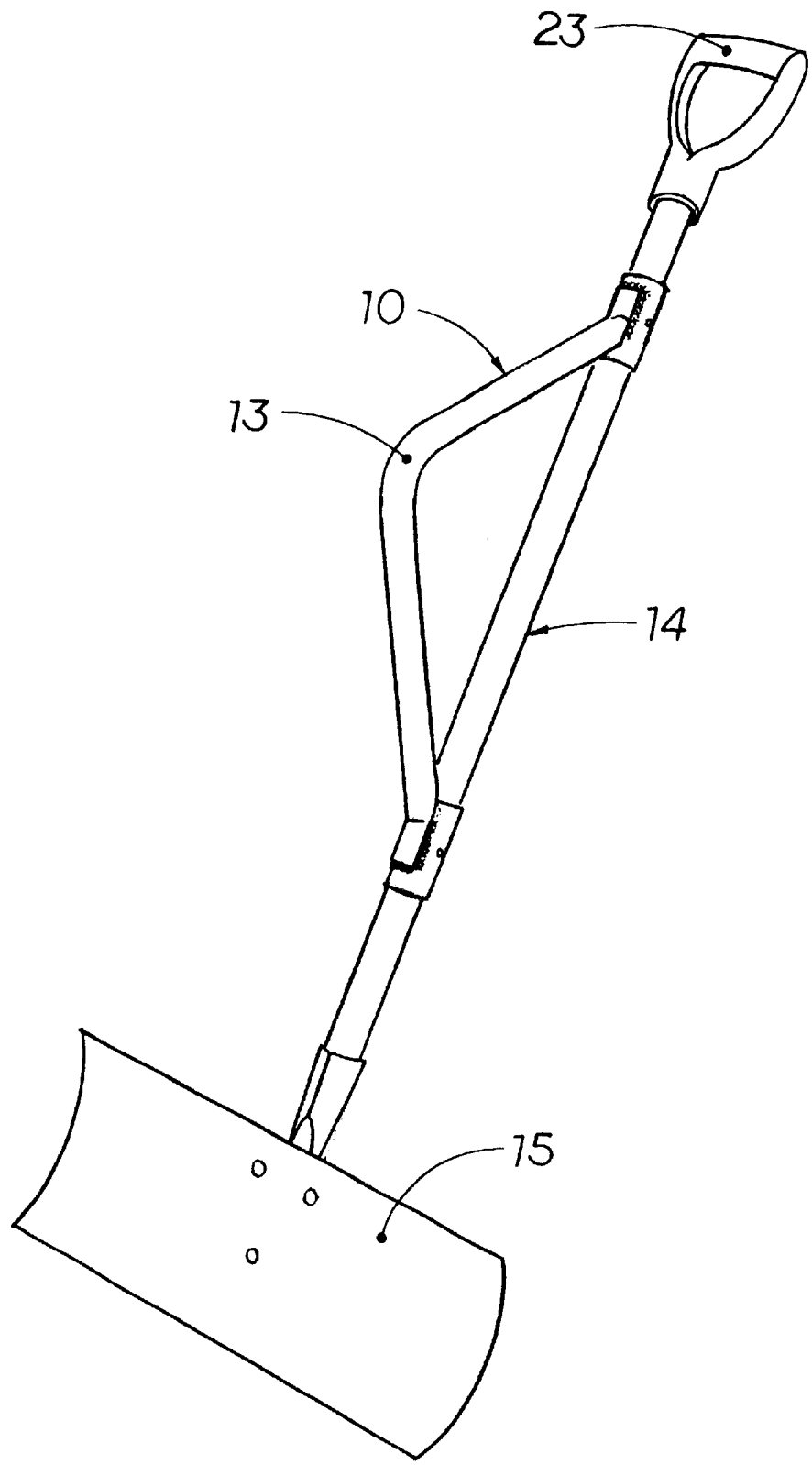
FIG. 17 is a front perspective elevation view of a shovel having the attachment according to the present invention fixedly mounted thereon.
Figure 18:
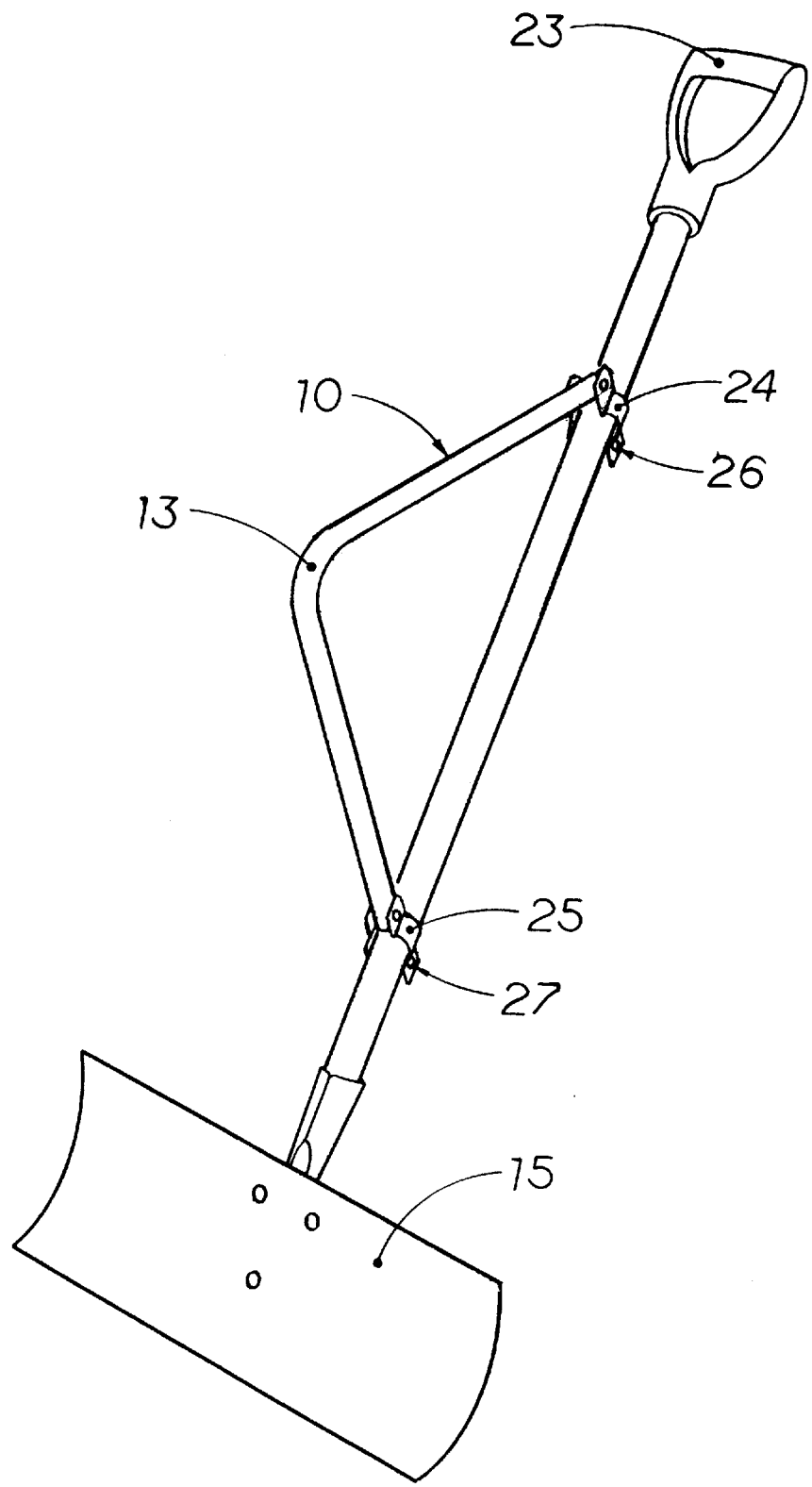
FIG. 18 is a front perspective elevation view of the shovel with the attachment removably mounted to the handle shaft of the shovel with clamping brackets.

Various modifications can be made without departing from the spirit of this invention or the scope of the appended claims The mountings of the attachment member 10 set forth in the above description are given as examples and are in no way final or binding. For example, the attachment member 10 may be permanently mounted in a fixed position with the angle portion 13 positioned on the top side of the shovel handle shaft 14 as shown in FIG. 17 to obtain some of the desirable results of the above desirable results. Alternatively, the attachment 10 may be removably mounted to the handle shaft 14 with clamps 24 and 25 fastened to the handle shaft 14 with nuts and bolts 26 and 27. Each one of the clamps 24 and 25 may be in the form of two substantially C-shaped brackets as best shown in FIG. 18. In view of the above, it will be seen that several objects of the invention are achieved and other advantages are obtained. As many changes could be made in the above construction and method without departing from the scope of the invention, it is intended that all matter contained in the above description shall be interpreted as illustrative and not in a limiting sense.

What I claim is:

1. A versatile attachment mountable to a handle shaft of a shovel comprising:

a short sleeve mountable on said handle shaft to locate adjacent to a blade portion of said shovel, a U clamp mounted on said short sleeve, said U clamp having two spaced legs, an elongated member having an obtuse angle portion formed therein, said elongated member having a lower end pivotally and removably mountable to one of said legs of said U clamp, and being maintained in place by a nut securing to said one of said legs, an elongated bolt mounted in a perpendicular manner at an upper free end of said elongated member, a cylindrical rotary wheel rotatably mounted on said bolt and secured in place by a second nut mounted to said bolt.

2. A versatile attachment according to claim 1 including a strap adaptable for tying said elongated member securely to said handle shaft.

3. A versatile attachment according to claim 1 wherein said elongated member is positioned selectively with said angle portion located above and below said handle shaft.

* * * * *